Patented Sept. 15, 1925.

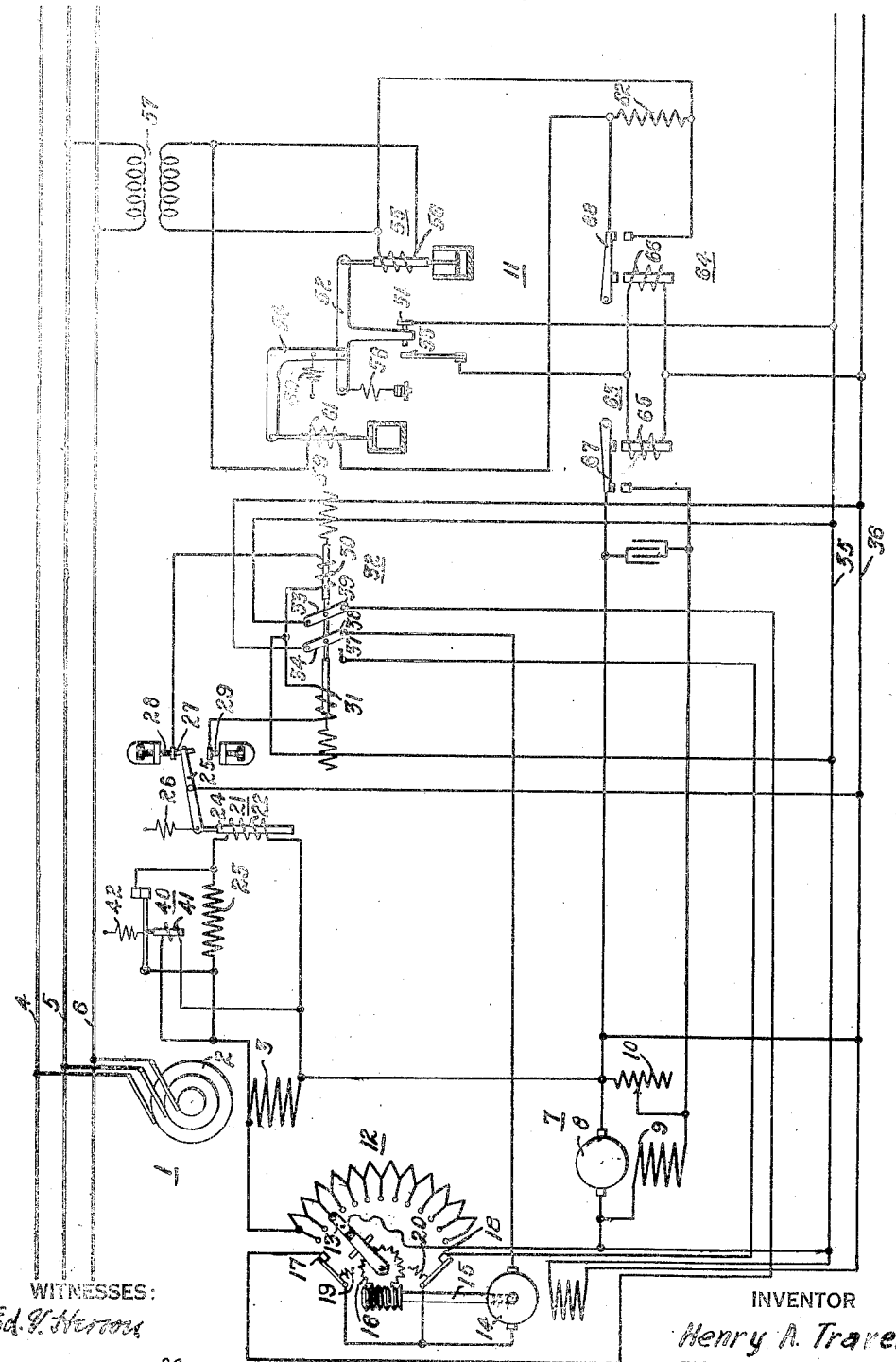

1,553,410

UNITED STATES PATENT OFFICE.

HENRY A. TRAVERS, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed September 16, 1918, Serial No. 254,207. Renewed November 24, 1924.

*To all whom it may concern:*

Be it known that I, HENRY A. TRAVERS, a citizen of the United States, and a resident of Wilkinsburg, in the county of Allegheny and State of Pennsylvania, have invented a new and useful Improvement in Regulator Systems, of which the following is a specification.

My invention relates to electric-regulator systems and particularly to regulator systems for maintaining substantially constant voltage in supply circuits.

One object of my invention is to provide a regulator system that shall be quickly responsive to correct any change of voltage in a supply circuit and be operative over a wide range of circuit changes in the supply circuit.

Another object of my invention is to provide a regulator system of the above-indicated character that shall embody means for effecting a rough-adjustment of the excitation of a dynamo-electric machine in accordance with supply-circuit conditions and further means for obtaining a finer adjustment of the excitation of the machine in accordance with the voltage obtaining in the supply circuit.

More specifically, my invention embodies a dynamo-electric machine, as, for example, an alternating-current generator or a synchronous condenser, which is connected to a supply circuit and is excited by means of an auxiliary generator. A vibrating-contact regulator is provided for adjusting the voltage of the exciter generator in accordance with the supply-circuit voltage, and means is further provided for adjusting the value of a resistor included in circuit with the field winding of the dynamo-electric machine for increasing the effective range of operation of the vibrating-contact regulator.

In operating a synchronous condenser, which is connected to an alternating-current supply circuit, it becomes necessary, at times, to vary the excitation of the condenser between very wide limits by reason of the varying load conditions existing on the supply circuit. Inasmuch as the commercial exciter generators now in service may only be satisfactorily operated between certain voltage limits for satisfactory operation, it becomes necessary to provide additional means for increasing the effective range of operation of the vibrating-contact regulator to vary the potential that is impressed across the field windings of the synchronous condenser. An exciter generator may be satisfactorily operated to generate current having a voltage range of from 60 to 150 volts, and a vibrating-contact regulator may be satisfactorily employed for governing the excitation of the exciter generator to generate the above range of voltage. When it is desired to under-excite the synchronous condenser considerably below-no-load excitation and take current which lags considerably behind the electromotive force, it may be necessary to reduce the potential impressed on the condenser field windings considerably below the lower limit for satisfactory operation of the exciter generator and of the governing vibrating-contact regulator.

In a system constructed in accordance with my invention, an adjustable resistor is connected in series with the synchronous-condenser field winding and the armature of the exciter generator for reducing the potential across the condenser field winding below the lower limit that may be generated by the exciter generator when an extreme lagging current is required by the synchronous condenser. Means is provided that is connected across the condenser field winding for varying the resistor in accordance with the voltage that is impressed across the condenser field winding. Thus, in case the potential across the condenser field winding is reduced by the vibrating-contact regulator to the lower voltage limit of the exciter generator, the resistor is operated in a manner to increase the resistance in the circuit of the condenser field winding and of the exciter-generator armature and permit further reduction of the condenser field-winding excitation by means of the vibrating-contact regulator.

The single figure of the accompanying drawing is a diagrammatic view of a regulator system constructed in accordance with my invention.

Referring to the drawing, a synchronous condenser 1, embodying an armature 2 and a field winding 3, is connected across a supply circuit embodying conductors 4, 5 and 6. The field winding 3 of the condenser is energized by means of an exciter generator 7 which embodies an armature 8 and a shunt field winding 9. A resistor 10 is included in the circuit of the shunt field winding 9 and is adapted to be short-circuited by a vibrating-contact regulator 11 in accordance with the voltage obtaining in the supply circuit.

A rheostat 12, having a rotatable contact arm 13, is included in the circuit of the exciter armature 8 and the condenser field winding 3 for reducing the voltage impressed across the condenser field windings below the voltage which can be satisfactorily generated by means of the exciter generator. The contact arm 13 of the rheostat is given a movement of rotation in a clockwise and in a counter-clockwise direction by means of a motor 14 which is connected to the contact arm by means of a shaft 15 and a worm-gearing system 16. Two switches 17 and 18, which are respectively maintained in a closed position by means of springs 19 and 20, are adapted to be opened by the contact arm 13 when it is moved to predetermined positions in either direction. The switches 17 and 18 are included in the circuit of the motor 14 and serve to limit the movement of the contact arm 13.

A relay 21, having an energizing winding 22 connected, through a resistor 23, across the field winding 3, is provided for operating the motor 14 and, accordingly, the resistor 12 in accordance with the voltage impressed across the field winding 3. The relay 21 is further provided with a core armature 24 which is pivotally connected to a contact arm 25 and to oppose the action of a spring 26. The contact arm 25 is provided with a contact member 27 that is adapted to engage one of two stationary contact members 28 and 29, according to the energization of the electromagnet 21. The contact members 28 and 29 are respectively connected to the energizing coils 30 and 31 of a reversing switch 32 which serves to govern the direction of rotation of the motor 14.

The reversing switch 32 embodies two contact members 33 and 34 that are respectively connected to conductors 35 and 36 of a direct-current supply circuit which is preferably connected to the exciter generator 7. The contact members 33 and 34 are adapted to selectively engage stationary contact fingers 37, 38 and 39 according to the direction of rotation of the motor 14 that is desired. The energizing coils 31 and 30 of the reversing switch 32 are selectively connected across the supply conductors 35 and 36 by means of the relay 21.

A relay 40, having an energizing coil 41 connected across the condenser field winding 3, is provided for opening a short circuit around the resistor 23 in case the voltage impressed upon the winding 22 of the electromagnet 21 is above a safe operating value. Under normal operating conditions, the relay 40 is maintained in a closed position to short-circuit the resistor 23 by means of a spring 42.

The vibrating contact regulator 11 embodies a movable contact member 51, which is mounted upon a lever 52, and a resiliently mounted contact member 53 which cooperates with the contact member 51. The lever 52, which is pivotally mounted upon a bell-crank lever 54, is operated, in a well-known manner, by means of an electromagnet 55. The electromagnet 55 is provided with a winding 56 which is connected across the supply conductors 5 and 6 by means of a transformer 57. A counterweight 58 is connected near one end of the lever 52 for counterbalancing the weight of the armature of the electromagnet 55. The pivotally mounted bell-crank lever 54 is operated in one direction by means of an electromagnet 59 and in an opposite direction by means of a spring 60. The electromagnet 59 is provided with an energizing coil 61 which is connected in circuit with a resistor 62 across the supply conductors 5 and 6 by means of the transformer 57.

Two relays 63 and 64, respectively embodying energizing windings 65 and 66 and contact members 67 and 68, are provided for short-circuiting the resistors 10 and 62 which are respectively included in the circuit of the shunt field winding 9 and in the circuit of the energizing winding of the electromagnet 59. The energizing windings 65 and 66 of the relays are adapted to be connected across the auxiliary supply conductors 35 and 36 by means of the main-contact members 51 and 53 of the regulator.

The regulator 11 serves to govern the excitation of the exciter generator 7 in accordance with the voltage obtaining in the supply circuit and, accordingly, to regulate the excitation of the synchronous condenser 1 to maintain substantially constant voltage in the supply circuit. In case the voltage of the supply circuit is raised or lowered above or below a normal value, the electromagnet 55 is operated in accordance therewith for adjusting the main contact members 51 and 53. The contact members 51 and 53, in turn, control the relays 63 and 64 which respectively govern the resistance included in the exciter-generator-field-winding circuit and the circuit of the energizing winding for the electromagnet 59.

Assuming the apparatus of the system to be in the position illustrated and the voltage of the exciter generator 8 to be reduced below 60 volts, the lower voltage limit for the exciter generator and the regulator, then the spring 26 of the electromagnet 21 overcomes the action of the winding 22. Consequently, the circuit for the winding 30 of the reversing switch 32 is opened and a circuit is completed through the contact members 27 and 29 for energizing the winding 31. The reversing switch 32 is operated and the contact members 33 and 34 are moved to engage the contact fingers 37 and 38 and to complete a circuit through the motor 14 for operating it in a reverse direction. The circuit through the motor 14 extends from the supply conductor 36, through the contact member 34, contact finger 37, switch 18, motor 14, contact finger 38, and contact member 33 to the supply conductor 35. The motor 14 is operated in a manner to rotate the contact arm 13 of the rheostat 12 in a clockwise direction and insert resistance in the circuit of the exciter generator 8 and the condenser field winding 3. The circuit of the motor 14 is opened by means of the switch 18 when all, or a predetermined portion of, the rheostat resistance has been included in circuit with the generator 7.

When the resistance of the rheostat 12 is included in circuit with the exciter generator 7, it is apparent that the regulator 11 will at once become active to regulate the exciter generator in a manner to compensate for the additional resistance that has been inserted in the circuit of the condenser field winding 3. Thus, it is apparent that the effective range of operation of the regulator 11 and of the exciter generator 7 is greatly increased. In case the supply-circuit conditions are such that the voltage of the exciter generator is raised to a value such that the regulator 11 and the generator 7 can control the excitation of the field winding 3 without the inclusion of the rheostat 12 in circuit, then the electromagnet 21 is operated in a manner to reverse the position of the switch 32. Consequently, the motor 14 is operated in a reverse direction for excluding the rheostat 12 from the circuit of the condenser field winding 3. In brief, it will be noted that the regulator 11 is provided for governing the excitation of a synchronous condenser under normal supply-circuit conditions and, in case of abnormal supply-circuit conditions, additional means, namely, the resistor 12, which is controlled by the electromagnet 21 and the reversing switch 22, is provided for automatically increasing the effective range of operation of the regulator 11. It may also be noted that my invention is in no way limited to a synchronous condenser but will serve equally well for governing the voltage supplied to the supply circuit by means of a generator.

Modifications in the system and arrangement and location of parts may be made within the spirit and scope of my invention, and such modifications are intended to be covered by the appended claims.

I claim as my invention:

1. The combination with a synchronous condenser connected to an alternating-current supply circuit, an exciter generator having an armature and a field winding for energizing the condenser field winding, a motor-operated rheostat connected in series with the generator, and electromagnetic means controlled by the potential impressed across the condenser field winding for operating said rheostat, of additional means for controlling the excitation of the condenser field winding, and means adapted to vary the current value of said electromagnetic means at predetermined times.

2. The combination with a synchronous condenser connected to an alternating-current supply circuit, an exciter generator for energizing the condenser field winding, and means for varying the excitation of said field winding, of means comprising two relays controlled by the potential impressed across the field winding, one of said relays being adapted to operate within predetermined limits to control the excitation of said field winding, and the other relay being adapted to vary the current value of the first-mentioned relay.

3. The combination with a synchronous condenser connected to an alternating-current supply circuit, an exciter generator having an armature and a field winding for energizing the condenser field winding, a rheostat connected in series with the generator armature, a resistor connected in circuit with the generator field winding, and a motor for operating said rheostat, of means comprising two relays controlled by the potential impressed across the condenser field winding, one of said relays controlling said motor, a resistance element in the energizing circuit of said relay and controlled by the other relay, and means associated with the resistor for varying the excitation of the generator in accordance with the voltage obtaining in the supply circuit.

4. The combination with a synchronous condenser connected across a supply circuit, an exciter generator having an armature and a field winding for energizing the condenser field winding, and a motor-operated rheostat disposed in series with the generator armature and the condenser field winding, of means comprising two relays connected across the condenser field winding one of said relays controlling said rheostat in accordance with the potental impressed across the condenser field winding, a resistance element in the energizing circuit of said relay and controlled by the other relay and means for varying the excitation of the generator in accordance with the voltage obtaining in the supply circuit.

5. The combination with a synchronous condenser connected to an alternating-current supply circuit, an exciter generator having an armature and a field-magnet winding for energizing the condenser field-magnet winding, a resistor in circuit with the generator field-magnet winding, a rheostat connected in series relation with the generator armature, and a motor for operating said rheostat, of means comprising an electromagnet controlled by the potential impressed across the condenser field-magnet winding for operating said rheostat motor, a resistance element in the energizing circuit of said electromagnet, electroresponsive means for controlling said element and means associated with said resistor for varying the excitation of the generator in accordance with the voltage obtaining in the supply circuit.

6. The combination with a synchronous condenser connected across a supply circuit, an exciter generator having an armature and a field-magnet winding for energizing the condenser field-magnet winding, and a motor-operated rheostat disposed in series relation with the generator armature and the condenser field-magnet winding, of means comprising an electromagnet connected across the condenser field-magnet winding for operating said rheostat in accordance with variations in the potential of the condenser field-magnet winding, a resistance element in the energizing circuit of said electromagnet, electroresponsive means for controlling said element, and means for varying the excitation of the generator in accordance with the voltage obtaining in the supply circuit.

7. The combination with a synchronous condenser connected to an alternating-current supply circuit, an exciter generator having an armature and a field winding for energizing the condenser field winding, and a motor-operated rheostat connected in series with the generator, of means comprising a plurality of relays for controlling the operation of said rheostat, a portion of said relays being adapted to vary the operating range of another portion of said relays.

8. The combination with a dynamo-electric machine connected to an alternating-current supply circuit, an exciter generator having an armature and a motor-operated rheostat connected in circuit with the generator, of means comprising an electromagnet adapted to control the operation of said rheostat, and electroresponsive means adapted to extend the range of operation of said electromagnet.

9. The combination with a dynamo-electric machine to be regulated having an armature and a field-magnet winding, an exciter generator in circuit with said field-magnet winding and a motor-operated rheostat in circuit therewith, of means for controlling said rheostat and means for extending the range of operation of said control means.

10. The combination with a dynamo-electric machine connected to an alternating-current supply circuit, an exciter generator for energizing the machine field-magnet winding, and means for varying the excitation of said field-magnet winding, of means for controlling the excitation of said field-magnet winding comprising electroresponsive means controlled by the potential impressed upon said field-magnet winding and adapted to operate within predetermined limits, and means adapted to increase the operating range of the first-mentioned means.

11. The combination with a dynamo-electric machine connected to an alternating-current supply circuit, an exciter generator for energizing the machine field-magnet winding, and means for varying the excitation of said field-magnet winding, of means for controlling the excitation of said field-magnet winding comprising electroresponsive means controlled by the potential impressed upon said field-magnet winding and adapted to operate within predetermined limits, and electroresponsive means adapted to increase the operating range of the first-mentioned means.

12. The combination with a dynamo-electric machine connected to an alternating-current supply circuit, an exciter generator for energizing the machine field-magnet winding, and means for varying the excitation of said field-magnet winding, of means for controlling the excitation of said field-magnet winding, comprising electroresponsive means controlled by the potential impressed upon said field-magnet winding and adapted to operate within predetermined limits and electroresponsive means adapted to increase the operating range of the first-mentioned means controlled in accordance with supply-circuit voltage.

13. The combination with a dynamo-electric machine connected to a supply circuit, an exciter generator for energizing the field winding of said machine, a resistor disposed in the circuit of the machine field-magnet winding and the exciter generator, and means comprising a motor for controlling said resistor in accordance with the potential impressed across the machine field-magnet winding to permit the exciter generator to operate within predetermined limits, of switching means for governing the rotation of the motor in a forward and in a reverse direction, electroresponsive means for increasing the operating range of said switching means, and means for also governing the exciter voltage in accordance with the voltage obtaining in the supply circuit.

In testimony whereof, I have hereunto subscribed my name this 31st day of Aug. 1918.

HENRY A. TRAVERS.